No. 838,500. PATENTED DEC. 11, 1906.
J. H. COOK.
WIRE CABLE CLAMP.
APPLICATION FILED OCT. 21, 1901.

2 SHEETS—SHEET 1.

Witnesses:
Raphael Netter
Jessie B. Kay

John H Cook  Inventor
by
Frederick S Duncan Att'y

THE NORRIS PETERS CO., WASHINGTON, D. C.

No. 838,500. PATENTED DEC. 11, 1906.
J. H. COOK.
WIRE CABLE CLAMP.
APPLICATION FILED OCT. 21, 1901.

2 SHEETS—SHEET 2.

Witnesses:
Raphael Netter
Jessie B. Kay

John H Cook Inventor
by
Frederick S Duncan Atty

UNITED STATES PATENT OFFICE.

JOHN H. COOK, OF NEW YORK, N. Y., ASSIGNOR TO HENRY B. NEWHALL, OF PLAINFIELD, NEW JERSEY.

WIRE-CABLE CLAMP.

No. 838,500.   Specification of Letters Patent.   Patented Dec. 11, 1906.

Application filed October 21, 1901. Serial No. 79,352.

*To all whom it may concern:*

Be it known that I, JOHN H. COOK, a citizen of the United States, and a resident of New York, in the county of Kings and State of New York, have invented a new and useful Improvement in Wire-Cable Clamps, of which the following is a specification, taken in connection with the accompanying drawings, annexed to and forming a part of the same.

This invention relates to wire-cable clamps adapted to secure the ends of a cable of woven or twisted wire by securing the cable in the grooves in the clamp.

Figure 1:
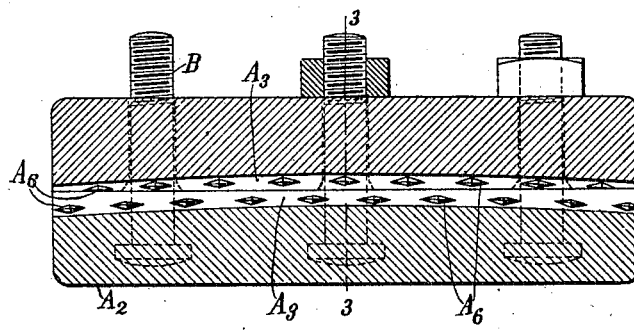
Figure 2:
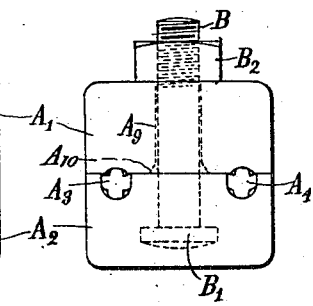
Figure 3:
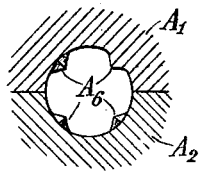
Figure 4:
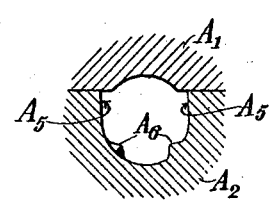
Figure 5:
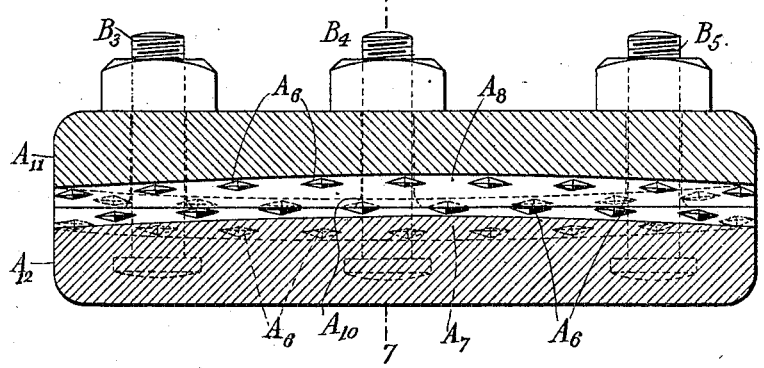
Figure 6:
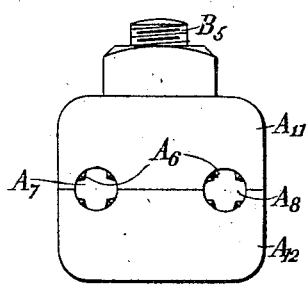
Figure 7:
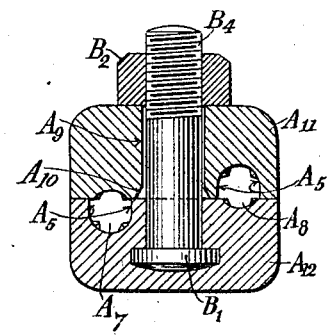

In the accompanying drawings, in which the same reference character refers to similar parts in the various figures, Figure 1 is a longitudinal section of one form of my invention, taken through one of the grooves. Fig. 2 is an end view of the same. Fig. 3 is a detail sectional view on line 3 3 of Fig. 1. Fig. 4 is also a detail sectional view showing the form of grooves. Fig. 5 is a longitudinal sectional view of a modified form of clamp, taken through one of the grooves. Fig. 6 is an end view of the same. Fig. 7 is a central section on line 7 7 of Fig. 5.

The clamp is formed of a back and cover in which grooves are formed to more effectually grip a cable engaging these grooves. The cover and back are secured together by bolts, which are permanently secured to the back, preferably by casting them into the same, and these bolts are engaged by suitable nuts, which secure the back and cover together and grip the cable to which the clamp is applied with any desired degree of force.

The clamp is composed of the back $A_2$, preferably formed of cast-iron, although any other desired material may be used, and a number of bolts B are rigidly secured to the back, preferably by casting them into the same, the heads of the bolts $B_1$ being firmly embedded in the material of the back which is cast about them, so that the bolts are rigidly and permanently secured in proper position. If desired, the bolts may be permanently secured to the back in any other desired way, so that the back and bolts form one integral structure. The cover $A_1$ is formed, preferably, of cast material and is formed with three holes $A_9$, (see Fig. 2,) which are provided at their inner ends with the countersunk enlargements $A_{10}$, so that the cover is more readily put in place upon the bolts B, which are of course inserted through the holes $A_9$ in fitting the two parts of the clamp together. The grooves $A_3$ and $A_4$ extend longitudinally of the clamp on either side of the center of the same, and these grooves are in both the back and cover.

The grooves are of circular cross-section and extend varying distances into the cover and back at various points along the length of the same, as is indicated in Fig. 1. Fig. 3, which is a cross-section on the line 3 3 of Fig. 1, indicates that at the central portion of the clamp the groove extends equally into both the cover and back—that is, both the cover and back at this point are provided with a groove of semicircular cross-section. At the end of the clamp, however, the grooves are formed principally in the back, as indicated by Fig. 4, a section near the end of the clamp. The groove in the cover is seen to be very shallow at this point. This curved form of the grooves throughout the length of the clamp is to give the clamp a better grip upon the cable, which it engages, since the cable is wedged into the deeper parts of the grooves and is thereby gripped more securely. As is seen in Fig. 4, the deeper groove in the back is not exactly of circular contour, since the portions $A_5$ are relieved in order that they may be more readily formed by casting. These grooves are provided throughout their length with gripping projections $A_6$, formed, as indicated in Fig. 3, at angles of ninety degrees around the grooves. These projections, which are preferably of pyramidal or diamond contour, although they may be formed of any other desired contour, are spaced throughout the length of the groove, as indicated in Fig. 1. Projections of this form have been found to engage a wire cable very effectively and to grip the same firmly.

It will be noted that in the form of clamp shown in Figs. 1 to 4 the grooves on either side of the clamp are symmetrical, the groove on one side of the clamp being exactly like the groove on the other side, so that with this form of clamp the position of the back may be reversed so long as the grooved sides of the back and cover are brought together. There is no possibility of the cover being put on wrongly in assembling the clamp, since the grooves are symmetrical with respect to the center of the clamp. If desired, however, the grooves need not be formed symmetrically, and for some purposes it is preferable to form the grooves in the back and cover, as indicated in Figs. 5 to 7. In that case the grooves are both of varying depth at different points along the length of the clamp; but the two grooves $A_7$ and $A_8$ are not symmetrical about the center of the clamp, the groove $A_8$ curving upward, so that it has a greater depth at its central part in the cover $A_{11}$, while the groove $A_7$ at this point has a greater depth in the back $A_{12}$. It will be apparent, therefore, that with this unsymmetrical arrangement of grooves it is necessary that the clamp be assembled in the proper way and that it would be impossible to turn the cover through an angle of one hundred and eighty degrees, since in that case the two deep grooves would come together at the center and the two shallow grooves would come together, so that the clamp would not properly grip a cable inserted in it. In order to prevent the possibility of wrongly assembling the clamp, the bolts $B_3$, $B_4$, and $B_5$, which are permanently secured in the back, as has been stated, are unequally spaced in the back. The central bolt $B_4$, as seen in Fig. 5, is considerably nearer to the bolt $B_3$ than it is to the other bolt $B_5$. The holes $A_9$, cast in the cover, are correspondingly spaced, so that it is only possible to assemble this clamp in the way in which the grooves come into proper coaction. The gripping projections are similarly formed in this clamp. Instead of spacing the clamping-bolts unequally it is possible to prevent the improper assembling of the clamp in other ways—for instance, by forming suitable projections in the back to engage depressions in the cover, or this might be accomplished in other ways.

Many modifications may be made in this device by those skilled in this art without departing from the spirit of this invention, and it is possible to use parts of this invention without employing the whole of the same. I do not, therefore, wish to be limited by the disclosure which I have made in this case; but What I wish to secure by Letters Patent is set forth in the appended claims:

1. In a clamp, a back, three clamping-bolts permanently secured to said back arranged longitudinally along the center of the same, the central clamping-bolt being unequally spaced with respect to the other bolts, a cover to fit upon said back, said cover being provided with a centrally-arranged series of holes to receive said bolts, the spacing of said bolts and holes being arranged to secure the proper positioning of said back and said cover, said back being formed with longitudinal grooves on both sides of said bolts, said grooves being of varying depth at various points along the length of the same, said grooves being substantially semicircular in cross-section at the ends of said back and one of said grooves being curved so as to be deeper at the central portion of said back than at the ends and the other of said grooves being curved so as to be shallower at the central portion of said back than at the ends of the same, said cover being formed with longitudinal grooves on both sides of said holes, said grooves being curved to coact with the grooves in said back to form curved grooves of substantially circular cross-section.

2. In a clamp, a back, a series of clamping-bolts permanently secured to said back, said clamping-bolts being unequally spaced, a cover to fit upon said back, said cover being provided with a series of unequally-spaced holes to receive said bolts to secure the proper positioning of said cover upon said back, there being longitudinal grooves formed in said back and said cover on both sides of the same of varying depth at various points along the length of said grooves, the grooves in said back being curved so as to be of unequal depth at the center of the same, the grooves in said cover being curved to coöperate with the grooves in said back to form curved grooves of substantially circular cross-section.

3. In a clamp, back and cover members having grooves of varying depth in their coacting faces to form a plurality of curved grooves unsymmetrical about the centers of said members and means including a series of bolts to prevent the improper assembling of said members and to secure said members together.

4. In a clamp, back and cover members formed with grooves of varying depth in their coacting faces to constitute a plurality of curved longitudinal grooves, the grooves in each member being of unequal depth at the center of the same and means to prevent the improper assembling of said members and to secure the proper alinement of said grooved faces.

5. In a clamp, a back, a series of clamping-bolts unequally spaced in said back, a cover to fit upon said back, said cover being provided with a series of unequally-spaced holes to receive said bolts to secure the proper positioning of said cover upon said back, there being longitudinal grooves formed in said back and said cover on both sides of said bolts of varying depths at various points along the length of said grooves, the grooves in said back being curved so as to be of unequal depth at the center of the same, the grooves in said cover being curved to cooperate with the grooves in said back to form curved grooves of substantially circular cross-section.

6. In a clamp, a back, a centrally-arranged longitudinal series of clamping-bolts permanently secured to said back, a cover to fit upon said back, said cover being provided with a centrally-arranged longitudinal series of holes to receive said bolts, there being longitudinal grooves formed in said back and cover on both sides of the same of varying depth at various points along the length of the grooves to form curved grooves of substantially circular cross-section and a series of pyramidal projections formed on said back and cover to project into said grooves.

JOHN H. COOK.

Witnesses:
HARRY L. DUNCAN,
JOHN N. MOORE.